(12) United States Patent
Matsuoka

(10) Patent No.: US 11,485,217 B2
(45) Date of Patent: Nov. 1, 2022

(54) DRIVE UNIT AND POWER TRANSMISSION DEVICE

(71) Applicant: EXEDY Corporation, Neyagawa (JP)

(72) Inventor: Yoshihiro Matsuoka, Neyagawa (JP)

(73) Assignee: EXEDY CORPORATION, Neyagawa (JP)

( * ) Notice: Subject to any disclaimer, the term of this patent is extended or adjusted under 35 U.S.C. 154(b) by 244 days.

(21) Appl. No.: 16/904,905

(22) Filed: Jun. 18, 2020

(65) Prior Publication Data

US 2021/0039490 A1 Feb. 11, 2021

(30) Foreign Application Priority Data

Aug. 8, 2019 (JP) .............................. JP2019-146062

(51) Int. Cl.
| | |
|---|---|
| *B60K 6/387* | (2007.10) |
| *B60K 6/40* | (2007.10) |
| *B60K 17/02* | (2006.01) |
| *B60K 6/36* | (2007.10) |
| *B60K 6/38* | (2007.10) |

(52) U.S. Cl.
CPC ................ *B60K 6/387* (2013.01); *B60K 6/36* (2013.01); *B60K 6/40* (2013.01); *B60K 17/02* (2013.01); *B60K 2006/381* (2013.01)

(58) Field of Classification Search
CPC .................................... B60K 6/22; B60K 6/40
See application file for complete search history.

(56) References Cited

U.S. PATENT DOCUMENTS

| | | | | | |
|---|---|---|---|---|---|
| 3,939,936 | A * | 2/1976 | Vinton | ................... | B60K 17/06 180/374 |
| 6,179,078 | B1 * | 1/2001 | Belloso | ..................... | B60K 5/08 180/69.6 |
| 6,340,339 | B1 * | 1/2002 | Tabata | ................... | B60K 6/387 475/5 |
| 7,270,030 | B1 * | 9/2007 | Belloso | ..................... | B60K 5/08 74/661 |
| 10,144,411 | B2 * | 12/2018 | Belloso | ................. | B60W 10/08 |
| 2008/0156553 | A1 * | 7/2008 | Hoogenraad | .......... | B60W 10/06 701/99 |
| 2015/0008055 | A1 * | 1/2015 | Oriet | ........................ | B60K 6/26 180/65.245 |
| 2015/0090213 | A1 * | 4/2015 | Gausrab | .................. | F02N 11/14 903/905 |
| 2015/0239332 | A1 * | 8/2015 | Okuda | ................... | B60K 6/485 180/65.21 |
| 2019/0056026 | A1 * | 2/2019 | Dalum | ..................... | B60K 6/40 |

FOREIGN PATENT DOCUMENTS

JP 2013-136327 A 7/2013

* cited by examiner

*Primary Examiner* — Brian L Swenson
(74) *Attorney, Agent, or Firm* — United IP Counselors, LLC

(57) ABSTRACT

A drive unit is disclosed. The drive unit includes a first drive source, a first torque converter, a second drive source, a second torque converter, and a transmission. A torque is inputted from the first drive source to the first torque converter. The first torque converter includes a first turbine. A torque is inputted from the second drive source to the second torque converter. The second torque converter includes a second turbine. The second turbine is coupled to the first turbine. The transmission is disposed between a drive wheel and both the first and second torque converters.

9 Claims, 3 Drawing Sheets

DRIVE UNIT AND POWER TRANSMISSION DEVICE

CROSS-REFERENCE TO RELATED APPLICATIONS

This application claims priority to Japanese Patent Application No. 2019-146062, filed Aug. 8, 2019. The contents of that application are incorporated by reference herein in their entirety.

TECHNICAL FIELD

The present invention relates to a drive unit, particularly to a drive unit including two or more drive sources. Besides, the present invention relates to a power transmission device installed in the drive unit.

BACKGROUND ART

Hybrid vehicles include an engine and an electric motor as drive sources. For example, a hybrid vehicle described in Japan Laid-open Patent Application Publication No. 2013-136327 includes an engine, an electric motor, a clutch, a torque converter and a gearbox. The clutch is provided between the engine and the electric motor and allows or blocks transmission of power between the engine and the electric motor. The power, when generated in the engine, is herein outputted to the gearbox through the torque converter and is then transmitted therefrom to axles of the vehicle. By contrast, the power, when generated in the electric motor, is outputted to the gearbox directly or indirectly through the torque converter and is then transmitted therefrom to the axles.

In Japan Laid-open Patent Application Publication No. 2013-136327, depending on a travel mode, the power generated in the electric motor is outputted to the gearbox through the torque converter shared with the engine. Because of this, the clutch is required for synchronizing the rotational speed of the electric motor and that of the engine with each other. Besides, it is required to control timing of turning on and off the clutch.

BRIEF SUMMARY

It is an object of the present invention to enable a drive unit including two or more drive sources to omit installing a clutch between the drive sources, and further, to simplify control for switching the drive sources.

(1) A drive unit according to the present invention includes a first drive source, a first torque converter, a second drive source, a second torque converter and a transmission. The first torque converter, to which a torque is inputted from the first drive source, includes a first turbine. The second torque converter, to which a torque is inputted from the second drive source, includes a second turbine coupled to the first turbine. The transmission is disposed between a drive wheel and both the first and second torque converters.

In the present drive unit, the torque converters are provided in correspondence to the two drive units, respectively. In general, torque converters are configured such that when forward rotation (i.e., rotation directed to cause a stator to amplify a torque) is inputted to an impeller and a torque is transmitted from the impeller to a turbine, the torque is firstly transmitted from the impeller to hydraulic oil and is then transmitted therefrom to the turbine.

Contrarily to the above, when rotation is inputted to the turbine and a torque is transmitted from the turbine to the impeller, the torque is firstly transmitted from the turbine to the hydraulic oil. However, the amount of torque transmittable from the turbine to the hydraulic oil is quite small due to the shape of turbine blades (designed to receive a flow of hydraulic oil generated by the impeller but not to generate a flow of hydraulic oil unlike the impeller). Because of this, transmission of torque from the turbine to the impeller is substantially impossible. In other words, the torque converters function just like a one-way clutch.

In view of this, according to the present invention, the drive unit including the two drive sources is enabled to omit installation of a clutch by utilizing the one-way clutch-like function of the torque converter.

Specifically, when the second drive source is being stopped during actuation of the first drive source, the first turbine of the first torque converter and the second turbine of the second torque converter are coupled to each other. However, the amount of torque transmitted from the second turbine to the hydraulic oil is quite small. Hence, the magnitude of rotational resistance of the second turbine is quite low. Therefore, the amount of rotational loss caused by the second drive source kept stopped can be reduced to a quite small level. Because of this, it is not required to install a clutch for blocking transmission of torque between the first and second drive sources.

According to the present invention, the following working effects can be obtained as well.

(a) Even when difference in rotational speed between two drive sources is produced during actuation of the drive sources, the difference in rotational speed is absorbed by slippage to be caused between the impeller and the turbine in each torque converter. Because of this, control for eliminating shocks is simplified or no longer required in actuation of the two drive sources.

(b) For example, it is herein assumed to employ an electric motor as a drive source. When a vehicle starts moving under actuation of the electric motor, a clutch and a transmission act as loads on the electric motor in a drive unit with a well-known structure. By contrast, according to the present invention, only the outer shell of the torque converter including the impeller acts as a load on the electric motor. Because of this, the amount of inertia of the load is small, whereby heat generation can be inhibited in the electric motor.

It should be noted that in this case, heat generation occurs on the torque converter side. However, the vehicle is originally provided with a system for cooling the torque converters. Therefore, the cooling system for the entire vehicle can be intensively used as the system for cooling the torque converters.

(c) The torque converters are provided in correspondence to the drive sources, respectively. Hence, characteristics of each torque converter can be set to be matched with corresponding one of the drive sources. Because of this, each drive source can exert the maximum performance.

(2) Preferably, the transmission transmits to the drive wheel a resultant torque obtained by combining the torques inputted thereto from the first and second torque converters.

(3) Preferably, the transmission includes a forward/backward movement switching mechanism.

(4) Preferably, at least one of the first and second torque converters includes a direct coupling clutch directly transmitting the torque, inputted thereto, to the transmission.

(5) Preferably, the direct coupling clutch includes a damper mechanism absorbing torsional vibration.

(6) Preferably, the first drive source is an engine, whereas the second drive source is an electric motor.

(7) Preferably, the first and second drive sources are electric motors.

(8) Preferably, the drive unit further includes a brake controller braking a reverse driving force applied from the drive wheel by rotating the electric motor provided as the second drive source in a reverse direction to an output rotational direction.

(9) A power transmission device according to the present invention is a device that transmits a torque outputted from a first drive source and a torque outputted from a second drive source. The power transmission device includes a first torque converter, a second torque converter and a transmission. The first torque converter, to which the torque outputted from the first drive source is inputted, includes a first turbine. The second torque converter, to which the torque outputted from the second drive source is inputted, includes a second turbine coupled to the first turbine. The transmission transmits, to the drive wheel, a resultant torque obtained by combining the torques inputted thereto from the first and second torque converters.

Overall, according to the present invention described above, a drive unit including two or more drive sources is enabled to omit installing a clutch between the drive sources, and further, to simplify or omit control for switching the drive sources.

DETAILED DESCRIPTION

Configuration

Figure 1:
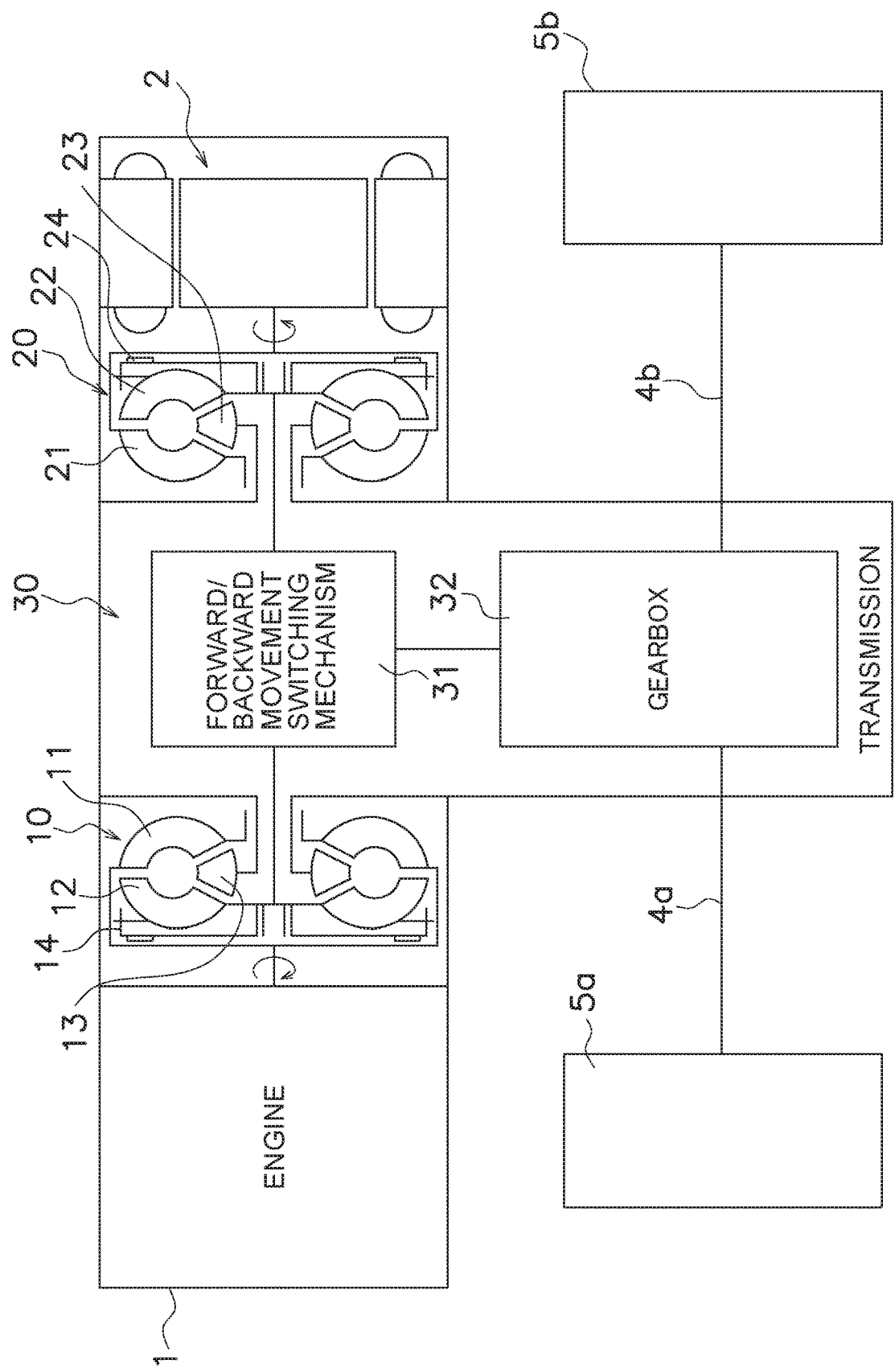
FIG. 1 is a block diagram showing a schematic configuration of a drive unit according to a preferred embodiment of the present invention.

FIG. 1 is a schematic diagram of a drive unit according to a preferred embodiment of the present invention. The drive unit includes two drive sources composed of an engine 1 (exemplary first drive source) and an electric motor 2 (exemplary second drive source), a first torque converter 10, a second torque converter 20 and a transmission 30. The drive unit is installed in a hybrid vehicle and transmits a torque outputted from the engine 1 and that outputted from the electric motor 2 to wheels 5a and 5b through the transmission 30 and drive shafts 4a and 4b.

The engine 1 is herein defined as rotated clockwise as seen in a direction from the engine 1 to the first torque converter 10. In this case, the electric motor 2 is rotated counterclockwise as seen in a direction from the electric motor 2 to the second torque converter 20. In other words, the direction of rotation inputted to the transmission 30 from the engine 1 and that of rotation inputted to the transmission 30 from the electric motor 2 are identical to each other.

The first torque converter 10 is a device to which a torque generated in the engine 1 is inputted. The first torque converter 10 includes a first impeller 11, a first turbine 12 and a first stator 13. The first torque converter 10 further includes a lock-up clutch 14 that transmits the torque generated in the engine 1 directly to the first turbine 12. Then, an output from the first turbine 12 is inputted to the transmission 30. Besides, the first torque converter 10 is a type of torque converter with characteristics that matching with the engine 1 is made in a relatively high range of rotational speed.

The second torque converter 20 is a device to which a torque generated in the electric motor 2 is inputted. The second torque converter 20 has basically the same configuration as the first torque converter 10. Specifically, the second torque converter 20 includes a second impeller 21, a second turbine 22 and a second stator 23. The second torque converter 20 further includes a lock-up clutch 24. An output from the second turbine 22 is inputted to the transmission 30. Besides, the second turbine 22 is coupled to the first turbine 12 through the transmission 30. It should be noted that the second torque converter 20 is a type of torque converter with characteristics that matching with the electric motor 2 is made not in the relatively high range of rotational speed rather in a relatively low range of rotational speed unlike the first torque converter 10.

The transmission 30 combines the torque inputted thereto from the first torque converter 10 and that inputted thereto from the second torque converter 20 and transmits the resultant torque to the drive shafts 4a and 4b. The transmission 30 includes a forward/backward movement switching mechanism 31 and a gearbox 32. The configuration of the forward/backward movement switching mechanism 31 is not particularly limited to a specific configuration. Hence, the forward/backward movement switching mechanism 31 can be composed of heretofore known components such as a gear train, a clutch and so forth. Likewise, the configuration of the gearbox 32 is not particularly limited to a specific configuration. Hence, the gearbox 32 can be composed a plurality of gear trains, a CVT, a planetary gear mechanism or so forth.

Actions

When a vehicle starts moving or travels at low vehicle velocity, for instance, the electric motor 2 is actuated whereas the engine 1 remains stopped. In this case, the torque generated in the electric motor 2 is inputted to the forward/backward movement switching mechanism 31 through the second torque converter 20 and is then further inputted to the gearbox 32. The torque generated in the electric motor 2 is amplified in the second torque converter 20 and the resultant torque is transmitted to the transmission 30.

When only the electric motor 2 is being actuated, the torque generated in the electric motor 2 is transmitted from the second impeller 21 to the second turbine 22 and is then inputted to the first turbine 12 through the forward/backward movement switching mechanism 31. However, the torque inputted to the first turbine 12 is not transmitted to the first impeller 11. In other words, one-way clutch-like working is realized by the first torque converter 10, whereby rotational resistance of the first turbine 12 can be reduced to a quite low level. Therefore, rotational loss can be inhibited from being caused by engine 1-side members in a travel mode under actuation of the electric motor 2.

Incidentally, especially when the vehicle starts moving, the amount of inertia is large on a load-side component such as the transmission 30. However, the second torque converter 20 is provided between the electric motor 2 and the transmission 30. Hence, when the vehicle starts moving, only the outer shell of the second torque converter 20 acts as a load on the electric motor 2. Because of this, heat generation can be inhibited in the electric motor 2.

It should be noted that heat generation is herein supposed to occur in the second torque converter 20. However, the vehicle is provided with a cooling system for inhibiting heat generation in the first and second torque converters 10 and 20. Hence, heat generation in the second torque converter 20 can be inhibited by the cooling system. In other words, the cooling system can be intensively used as the system for cooling the torque converters 10 and 20.

Next, when accelerator pedal is pressed down by a driver, for instance, the travel mode under actuation of only the electric motor 2 transitions to either a travel mode under actuation of only the engine 1 or a travel mode under actuation of both the engine 1 and the electric motor 2.

The torque, generated in the engine 1, is inputted to the forward/backward movement switching mechanism 31 through the first torque converter 10 and is then further inputted to the gearbox 32. The torque is subsequently transmitted to the drive shafts 4a and 4b through the gearbox 32.

When the vehicle travels under actuation of both the engine 1 and the electric motor 2, the torque generated in the engine 1 and that generated in the electric motor 2 are combined in the transmission 30 and the resultant torque is transmitted to the drive shafts 4a and 4b.

When the vehicle travels under actuation of only the engine 1, the torque generated in the engine 1 is transmitted from the first impeller 11 to the first turbine 12 and is then inputted to the second turbine 22 through the forward/backward movement switching mechanism 31. However, the torque inputted to the second turbine 22 is not transmitted to the second impeller 21. In other words, one-way clutch-like working is realized by the second torque converter 20, whereby rotational resistance of the second turbine 22 can be reduced to a quite low level. Therefore, rotational loss can be inhibited from being caused by electric motor 2-side members in the travel mode under actuation of the engine 1.

Now, there is difference in rotational speed between the engine 1 and the electric motor 2 in the travel mode under actuation of both the engine 1 and the electric motor 2, in switching from the travel mode under actuation of the electric motor 2 to the travel mode under actuation of the engine 1, and vice versa. However, the difference in rotational speed between the both is absorbed by slippage of the first and second torque converters 10 and 20. Therefore, unlike a well-known device using a clutch, it is not required to execute complex control composed of detecting the rotational speed of the engine and that of the electric motor, controlling timing of turning on the clutch, and so forth.

It should be noted that in the present device, the transmission 30 is provided with the forward/backward movement switching mechanism 31. Because of this, it is not required to change the rotational direction of the electric motor 2 in backward movement. In other words, the direction of rotation inputted to the second torque converter 20 from the electric motor 2 remains unchanged regardless of forward movement and backward movement. Therefore, torque amplification is enabled even when the vehicle travels backward under actuation of the electric motor 2.

Other Preferred Embodiments

The present invention is not limited to the preferred embodiment described above, and a variety of changes or modifications can be made without departing from the scope of the present invention.

Figure 2:
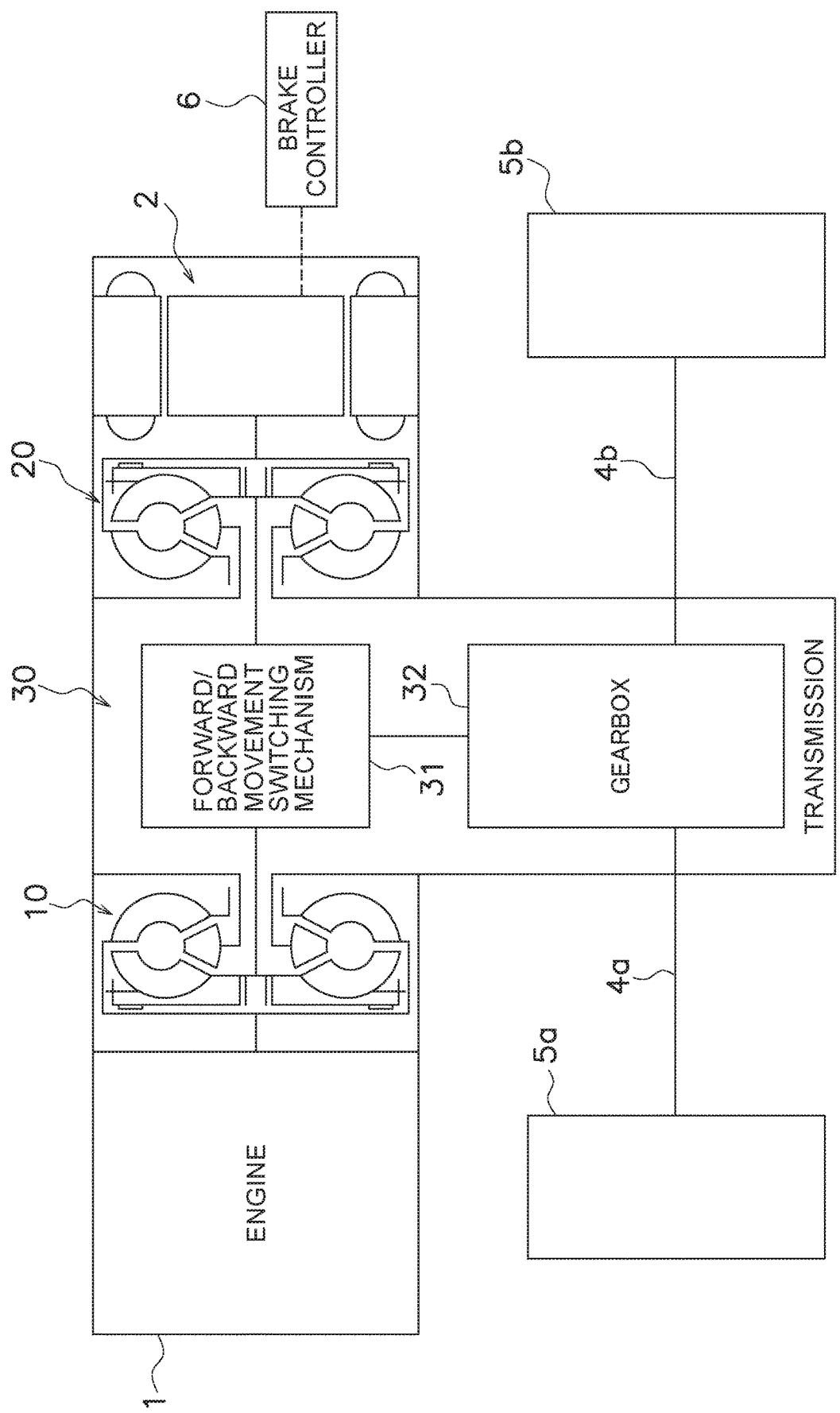
FIG. 2 is a diagram corresponding to FIG. 1 and shows a drive unit according to another preferred embodiment of the present invention.

(a) FIG. 2 shows another preferred embodiment. In this preferred embodiment, a reverse driving force, applied from the drive wheels, can be braked by the electric motor 2. Specifically, a brake controller 6 is connected to the electric motor 2. The brake controller 6 is a controller for activating a TC brake mode in response to an external instruction. In the TC brake mode, the electric motor 2 is rotated reversely with respect to the rotational direction of output in normal traveling. Accordingly, the torque generated in the electric motor 2 adversely acts on the second turbine 22, whereby a braking force can be obtained.

It should be noted that when brake control is executed by reversely rotating the electric motor 2 as described above, some sort of brake control (engine braking, regenerative control) is performed as well in the first drive source. Therefore, when the braking force generated by only the first drive source-side brake control is insufficient, the braking force generated in the TC brake mode is added to the insufficient braking force.

Figure 3:
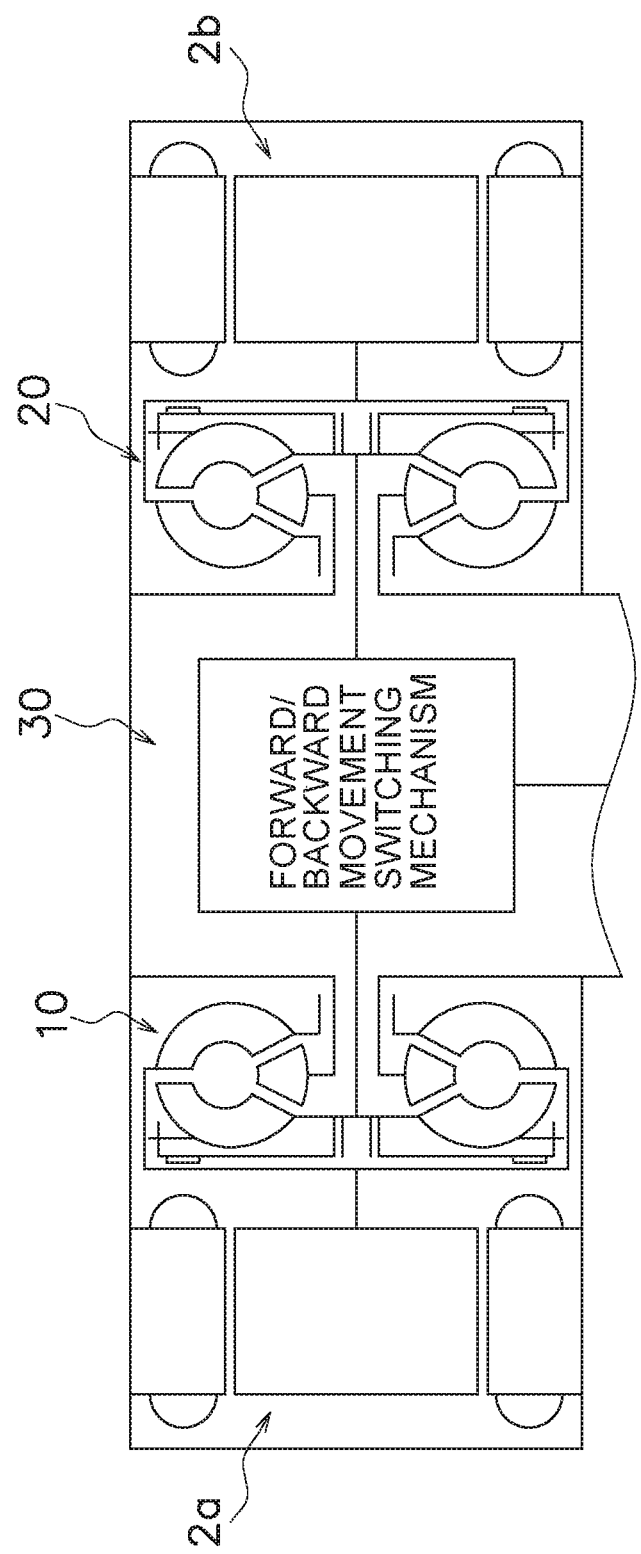
FIG. 3 is a diagram corresponding to FIG. 1 and shows a drive unit according to yet another preferred embodiment of the present invention.

(b) In the aforementioned preferred embodiment, the engine is employed as the first drive source, whereas the electric motor is employed as the second drive source. However, as shown in FIG. 3, electric motors 2a and 2b can be employed as the first and second drive sources. The other constituent elements in FIG. 3 are similar to corresponding ones in FIG. 1.

(c) The number of drive sources is not limited to that in the aforementioned preferred embodiment. The present invention is similarly applicable to a drive unit including three or more drive sources. Specifically, three drive sources can be each provided with a torque converter. A transmission can be configured to combine torques outputted from the torque converters of the drive sources and transmit the resultant torque to drive shafts.

(d) In the aforementioned preferred embodiment, the first and second torque converters 10 and 20 are coupled through the forward/backward movement switching mechanism 31. However, two torque converters can be directly coupled to each other.

Alternatively, two transmissions can be provided such that a torque is inputted to one transmission from a first torque converter whereas a torque is inputted to the other transmission from a second torque converter. Outputs from the transmissions can be configured to be combined, and the resultant output can be configured to be transmitted to drive shafts. Furthermore, the outputs from the transmissions can be configured to be transmitted to the drive shafts on a one-to-one correspondence.

REFERENCE SIGNS LIST

1 Engine (first drive source)
2, 2a, 2b Electric motor
10 First torque converter
20 Second torque converter
30 Transmission
31 Forward/backward movement switching mechanism

What is claimed is:
1. A drive unit comprising:
a first drive source;
a first torque converter to which a torque is inputted from the first drive source, the first torque converter including a first turbine and a first impeller;
a second drive source;
a second torque converter to which a torque is inputted from the second drive source, the second torque con- verter including a second turbine and a second impeller, the second turbine coupled to the first turbine; and a transmission disposed between a drive wheel and both the first and second torque converters, wherein when only the first drive source is actuated, the torque generated in the first drive source is transmitted from the first impeller to the first turbine and then to the second turbine without being transmitted from the second turbine to the second impeller, and when only the second drive source is actuated, the torque generated in the second drive source is transmitted from the second impeller to the second turbine and then to the first turbine without being transmitted from the first turbine to the first impeller.

2. The drive unit according to claim 1, wherein the transmission is configured to transmit to the drive wheel a resultant torque obtained by combining the torques inputted thereto from the first and second torque converters.

3. The drive unit according to claim 2, wherein the transmission includes a forward/backward movement switching mechanism.

4. The drive unit according to claim 1, wherein at least one of the first and second torque converters includes a direct coupling clutch configured to directly transmit the torque inputted thereto to the transmission.

5. The drive unit according to claim 4, wherein the direct coupling clutch includes a damper mechanism configured to absorb torsional vibration.

6. The drive unit according to claim 1, wherein
the first drive source is an engine, and
the second drive source is an electric motor.

7. The drive unit according to claim 1, wherein the first and second drive sources are electric motors.

8. The drive unit according to claim 1, further comprising:
a brake controller configured to brake a reverse driving force applied from the drive wheel by rotating an electric motor provided as the second drive source in a reverse direction to an output rotational direction.

9. A power transmission device transmitting a torque outputted from a first drive source and a torque outputted from a second drive source, the power transmission device comprising:

a first torque converter to which the torque outputted from the first drive source is inputted, the first torque converter including a first turbine and a first impeller;

a second torque converter to which the torque outputted from the second drive source is inputted, the second torque converter including a second turbine and a second impeller, the second turbine coupled to the first turbine; and a transmission configured to transmit to the drive wheel a resultant torque obtained by combining the torques inputted thereto from the first and second torque converters, wherein when only the first drive source is actuated, the torque generated in the first drive source is transmitted from the first impeller to the first turbine and then to the second turbine without being transmitted from the second turbine to the second impeller, and when only the second drive source is actuated, the torque generated in the second drive source is transmitted from the second impeller to the second turbine and then to the first turbine without being transmitted from the first turbine to the first impeller.

* * * * *